Jan. 12, 1926.  1,569,046
J. A. STAHLE
RESILIENT WHEEL
Original Filed Feb. 1, 1922   2 Sheets-Sheet 1

INVENTOR
JOHN A. STAHLE.
BY *Heard Smith Tennant*
ATTYS.

Jan. 12, 1926.  1,569,046
J. A. STAHLE
RESILIENT WHEEL
Original Filed Feb. 1, 1922   2 Sheets-Sheet 2
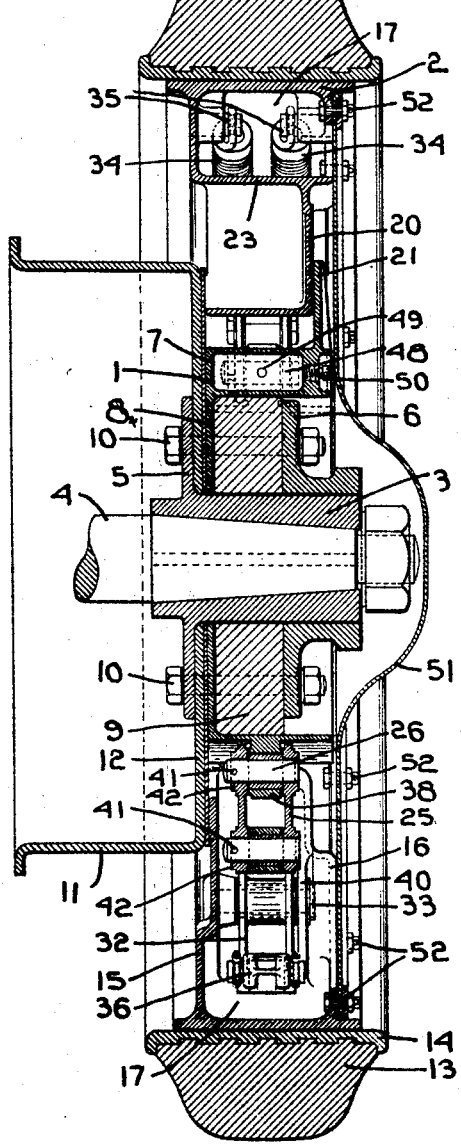
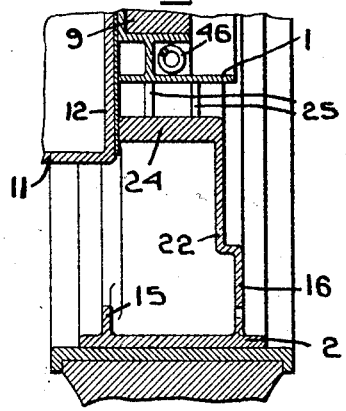
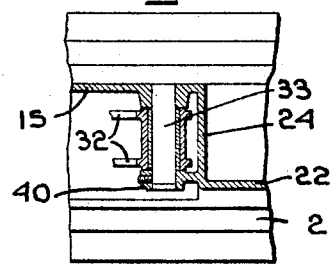
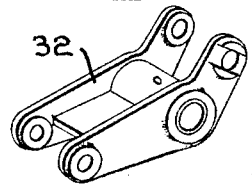
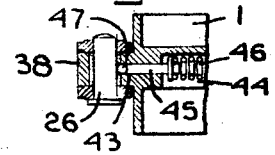
INVENTOR
JOHN A. STAHLE
BY *Heard Smith & [illegible]*
ATTYS.

Patented Jan. 12, 1926.

1,569,046

UNITED STATES PATENT OFFICE.

JOHN A. STAHLE, OF BOSTON, MASSACHUSETTS, ASSIGNOR TO STAHLE MECHANICAL TIRE CO. LTD., OF BOSTON, MASSACHUSETTS, A CORPORATION OF MAINE.

RESILIENT WHEEL.

Application filed February 1, 1922, Serial No. 533,447. Renewed June 2, 1925.

*To all whom it may concern:*

Be it known that I, JOHN A. STAHLE, a citizen of the United States, residing at Boston, county of Suffolk, State of Massachusetts, have invented an Improvement in Resilient Wheels, of which the following description, in connection with the accompanying drawing, is a specification, like characters on the drawing representing like parts.

This invention relates to vehicle wheels of that type comprising an inner or hub section, an outer or tire-receiving section, and a system of links, levers and springs connecting said sections so that the hub section will be yieldingly sustained.

The object of the invention is to provide an improved vehicle wheel of this type which has the various advantages and novel features which will be hereinafter set forth.

In order to give an understanding of my invention I have illustrated in the drawings a selected embodiment thereof which will now be described after which the novel features will be pointed out in the appended claims.

In the drawings, Fig. 1 is a side view of a wheel embodying my invention with the cover plate removed.

Fig. 2 is a section on the line 2—2, Fig. 1.

Fig. 3 is an enlarged section on the line 3—3, Fig. 1.

Fig. 4 is a section on the line 4—4, Fig. 1.

Fig. 5 is a perspective view of the lever 32.

Fig. 6 is a sectional view showing the operation of the pin 45 in taking up slack due to wear.

Figure 1:
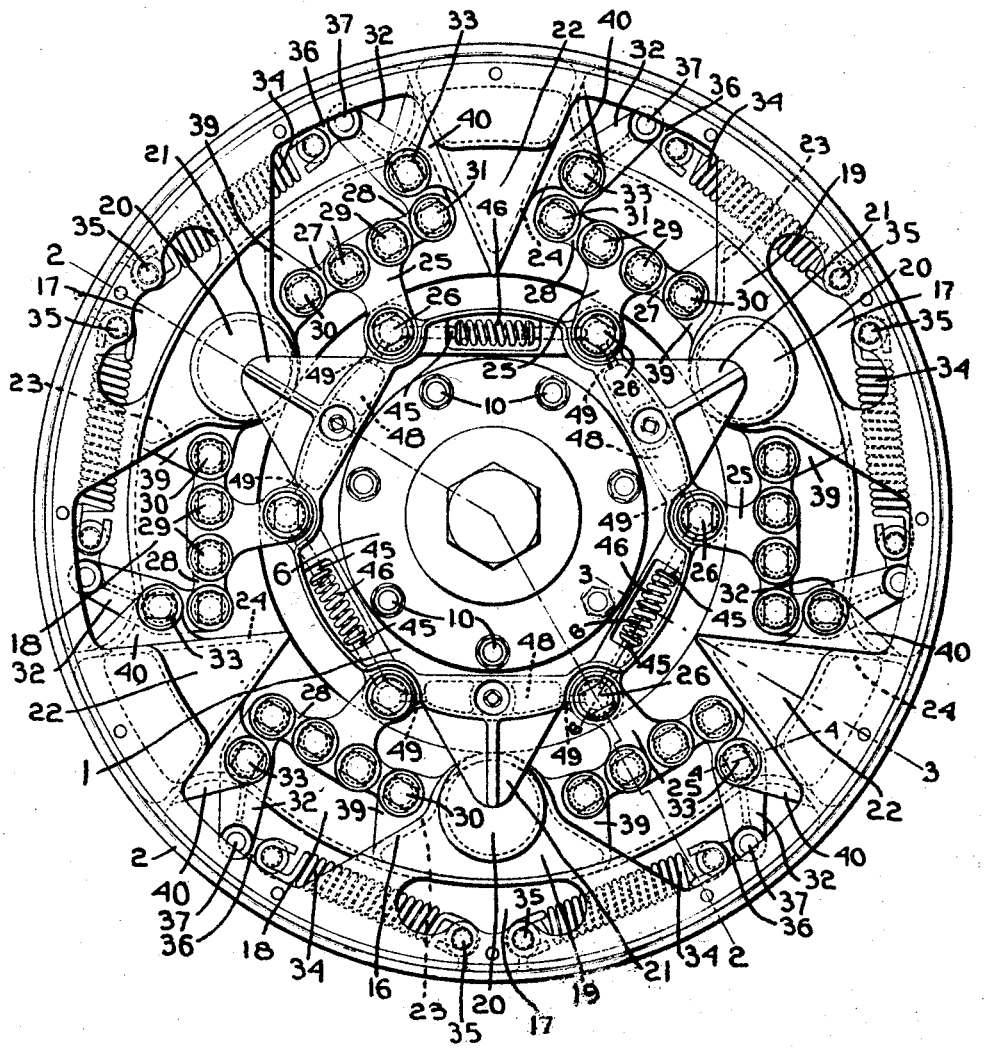

The wheel structure herein shown comprises an inner or hub member indicated generally at 1, an outer or tire-receiving member indicated generally at 2, and an arrangement of springs and levers connecting said members which give the desired resiliency to the wheel.

The hub member or central member comprises the hub proper 3 which is adapted to be secured to the axle 4 of the vehicle and which is provided with the hub flanges 5, 6 and an annular member indicated at 7 which is secured between the flanges 5 and 6. This annular member is constructed to have the spring and lever units pivotally connected thereto and is shown as formed with an inwardly-directed flange 8 which is received between the flanges 5 and 6. 9 indicates a filling member which may be of wood if desired and which fills the spaces between the flange 8 and the hub flange 6, said hub flanges, filling member and flange 8 of the part 7 being rigidly secured together by the clamping bolts 10. If the wheel is a rear wheel then it will be provided with a brake drum 11 which has a flange 12 integral therewith that is also clamped between the hub flanges.

The outer or tire-receiving member 2 is constructed to receive the tire 13, which if desired, may be carried by a rim 14 which may either be rigidly carried by the tire-receiving member 2 or may be in the form of a demountable rim removably carried by said member.

Said outer member 2 is formed with two inwardly-directed flanges 15, 16 which form between them spaces or chambers 17 to receive the springs of the spring and lever construction and which also form between them spaces or chambers 18 to receive the levers of the spring and lever connections. The flange portion 16 is not continuous but is constructed to present sections 19 that are formed with faces 20 adapted to have engagement with projections 21 extending outwardly from the hub member 1, said projections operating to prevent lateral movement of the outer or tire-receiving member relative to the hub member. The flange portion 16 is also provided with other sections 22 which are situated between the sections 19. The sections 19 are connected to the flange 15 by transverse walls 23 and the flange sections 22 are connected to the flange 15 by transverse walls 24. The flange 15 is preferably provided with openings opposite each of the sections 19 and 22.

The outer member may be either in the form of a cast or may be made from stamped metal. One object of making the structure with the openings opposite the flange sections 19 and 22 is to provide a structure which can be made of cast metal.

The spaces 17 to receive the springs of the spring and lever connections are situated between the two flanges 15 and 16 and the spaces 18 to receive the levers of the spring and lever connections are situated between the flange portions 19 and 22 of the outer member. The spring and lever connections above referred to are made from units each comprising pivoted-connected links, levers and springs acting thereon. Each of said units includes a floating member 25 having its inner end pivotally connected to the hub member 7, as shown at 26 and having its outer end pivotally connected at 29 to two links 27 and 28, the link 27 being pivoted to the outer member 2 as shown at 30 and the link 28 being pivoted at 31 to the inner end of a spring-actuated lever 32 which extends in a general radial direction and is pivoted to the outer member 2 at 33. The outer end of each lever 32 is acted upon by one or more springs 34 which extend at substantially right angles to a radial line, said springs being connected at one end to the outer or tire-receiving member, as shown at 35, and at the other end being connected to a link 36 which is pivoted to the outer end of the lever 32 as shown at 37. A plurality of these spring and lever units are employed, but the number which is used in any wheel may be varied depending upon the size of the wheel and the load which it is intended to support. In the construction shown I have illustrated six of these units, each of them having the construction shown.

The units are preferably shaped so that the adjacent units are reversed with reference to each other and with this construction the springs 34 of one unit will extend in opposite direction from the springs of the next adjacent unit. When the wheel is not supporting any load the springs 34 act through the levers 32 to apply a pulling strain on the links 28 and as the member 25 is a floating or free member it will follow that normally the parts of each unit will assume a position with the links 27, 28 in line with each other, as shown in Fig. 1.

When weight is applied to the hub the latter will tend to move downwardly relative to the tire-receiving member and this downward movement will carry the floating members 25 at the lower portion of the wheel downwardly and said float members will have a slight turning movement as they thus move downwardly, such movement operating to carry the pivotal points 29 out of the line of the pivotal points 30, 31. This will result in shortening the distance between the pivotal points 30, 31 and thereby swinging the lever 32 against the action of the spring 34.

The same action will occur with relation to the spring and link units at the upper part of the wheel except that the movement of the floating member 25 is away from the periphery of the tire-receiving member rather than towards it. The link and lever units which are in the horizontal diameter of the wheel are also operative in supporting the load because the downward movement of the hub will give the floating members 25 a turning movement which will operate through the links 27, 28 to swing the levers 32 against the action of the springs 34. With this construction, therefore, all of the spring and lever units throughout the wheel are constantly active in yieldingly supporting the load.

The members of each link and lever unit may be made in various ways without departing from the invention. In the construction shown the hub member 7 is provided with bosses 38 to which the floating levers 25 are pivoted, and the floating levers 25 are each made in two sections between which the boss 38 is received, said two sections being pivoted to the boss by the pivot pin 26. The links 27, 28 are received at one end between the two sections of the floating member 25 and the other end of the link 27 is received between two ears 39 extending from the wall 23, while the other end of the link 28 is received between the forked end of the lever 32. This lever 32 is received between the flange 15 and an ear 40 extending from the wall 24.

All of the pivot pins for the link and lever structure will preferably be provided with wear bushings to take the wear and said pins are held from rotation by cotter pins 41 extending through the end of the pivot pins and through hubs 42 formed on the links and levers.

In order to take up any lost motion which may result from the wear on the pivot pins 26 for the float links 25 I propose to employ a construction in which each pivot pin will be acted on by a spring which applies pressure thereto in a direction transverse to its axis. The bosses 38 are provided with apertures 43 leading to chambers 44 formed in the hub portion 7. A pin 45 extends through each aperture, each pin being acted upon by a spring 46 in the chamber 44 and the spring applying pressure to the pin in the direction of its length. This pressure is communicated to the pivot pin 26 and said pin is, therefore, always held against the side of the bushing so that even if wear occurs due to any loosening of fit between the pin and the bushing it will be obviated.

I have shown herein a steel ball 47 between the thrust pin 45 and the pin 26, the purpose of the ball being to eliminate wear.

In order to simplify the construction I have provided an arrangement whereby one spring 46 operates on two of the thrust pins 45. This is provided for by forming a spring-receiving chamber 44 between two adjacent pivot pins 26 and providing the thrust pin 45 at each end of the spring 46 in said chamber. With this arrangement it will be necessary to use only half as many springs 46 as there are pivot pins 26.

To provide for lubricating the pivot pins 26 I propose to make the hub member 7 with lubricant-receiving cavities 48 which communicate with the bearings for the pivot pins 26 through passages or ducts 49. Each chamber 48 is provided with a removable plug 50 so that when the plug is removed lubrication may be forced into the chamber by means of a grease gun or some other suitable device.

I will preferably employ a cover plate 51 which is secured to the tire-receiving member at its periphery by suitable bolts as shown at 52, said cover plate enclosing the operative parts of the wheel and giving the wheel the appearance of a disk wheel.

It will be noted that when the cover plate 51 is removed the levers and spring units are all readily accessible so that they may be easily removed or repaired. It will also be noticed that the construction shown is such that the springs are also readily accessible thus facilitating the replacing of any springs which may become damaged or broken.

It will also be noted that when the parts are in neutral position as shown in Fig. 1, the links 27, 28 are in substantial alignment and when in this position each member 25 can have a slight movement without giving any appreciable movement to the lever 32. The parts will be so designed that when the vehicle with which the wheel is used is not loaded the parts will be substantially as shown in Fig. 1 and any slight movement or vibration which occurs in the ordinary running of the vehicle will be taken care of by the slight movement of the members 25 without giving any appreciable movement to the springs 34. If, however, a vehicle is heavily loaded or the wheel runs over an obstruction then the movement of the axle relative to the periphery of the wheel will be sufficient to throw the links 27, 28 appreciably out of alignment thus placing the springs 34 under increased tension.

I claim:

1. In a wheel, the combination with an inner hub member, of an outer tire-receiving member, a plurality of load-transmitting members pivoted at their inner ends to the hub member, a plurality of levers pivoted to the outer member, springs acting on said levers, a link pivotally connecting each load-transmitting member to the outer tire-receiving member and another link connecting each load-transmitting member to one of the levers.

2. In a wheel, the combination with an inner hub member, of an outer tire-receiving member, a plurality of load-transmitting members pivoted at their inner ends to the hub member, a plurality of levers pivoted intermediate of their ends to the outer member, springs acting on said levers, and a pair of links pivoted to each load-transmitting member, one link of each pair being pivoted to the outer member and the other to one of the levers.

3. In a wheel, the combination with an inner hub member, of an outer tire-receiving member, a plurality of load-transmitting members pivoted at their inner ends to the hub member, a plurality of levers pivoted intermediate of their ends to the outer member, springs acting on said levers, and a pair of links pivoted to each load-transmitting member, one link of each pair being pivoted to the outer member and the other to one of the levers, the pivotal points of the links of each pair normally being in alignment.

4. In a wheel, the combination with an inner hub member, of an outer tire-receiving member, a plurality of link-lever-and-spring units for connecting said members, pivot pins carried by the hub member and to which said units are pivotally connected, and a spring-pressed pin bearing against each pivot pin and operating to prevent lateral motion of the pivot pin as wear occurs.

5. In a wheel, the combination with an inner hub member having on one side outwardly-extending projections, a brake drum secured to the other side of the hub member, an outer or tire-receiving member encircling the hub member and provided with a rim having two flanges extending inwardly therefrom, the flange on the outer face of the wheel being interrupted to form flange sections, certain of which engage the projections on the hub member to prevent lateral movement, and spring and lever connecting devices situated between the sections of the interrupted flange and connecting the hub member and outer member.

6. In a wheel, the combination with an inner hub member having on one side outwardly-extending projections, a brake drum secured to the other side of the hub member, an outer or tire-receiving member encircling the hub member and provided with a rim having two flanges extending inwardly therefrom, the flange on the outer face of the wheel being interrupted to form flange sections, certain of which engage the projections on the hub member to prevent lateral movement, each flange section being connected to the other flange by a transverse wall, and said other flange having openings opposite the flange sections, and spring and lever connections secured to said transverse walls and situated between the flange sections and yieldingly connecting the outer member to the inner member.

In testimony whereof, I have signed my name to this specification.

JOHN A. STAHLE.